United States Patent [19]
Yamauchi

[11] Patent Number: 5,944,079
[45] Date of Patent: Aug. 31, 1999

[54] NUMERICAL CONTROL ROUTER ENCLOSED BY A HOUSING

[75] Inventor: Yoshiyuki Yamauchi, Shizuoka, Japan

[73] Assignee: Heian Corporation, Hamamatsu, Japan

[21] Appl. No.: 09/018,005

[22] Filed: Feb. 3, 1998

[30] Foreign Application Priority Data

Jun. 20, 1997 [JP] Japan ..................................... 9-180724

[51] Int. Cl.⁶ .................. B23B 7/04; B25H 1/00
[52] U.S. Cl. ...................... 144/286.5; 144/2.1; 144/48.1; 144/134.1; 144/154; 144/286.1; 144/356; 269/21; 29/26 A; 29/39; 29/559; 409/134; 409/137
[58] Field of Search ................... 144/2.1, 134.1, 144/135.2, 154, 48.1, 286.1, 286.5, 356; 29/26 R, 26 A, 37 R, 35.1, 39, 559; 269/21; 409/134, 137, 189, 192, 903

[56] References Cited

U.S. PATENT DOCUMENTS

| | | | |
|---|---|---|---|
| 4,949,942 | 8/1990 | Shoda | 144/48.1 |
| 5,107,910 | 4/1992 | Sasaki | 144/48.1 |
| 5,323,821 | 6/1994 | Suzuki | 269/21 |
| 5,564,483 | 10/1996 | Sacchi | 144/286.5 |
| 5,575,318 | 11/1996 | Susnjara | 144/48.1 |

*Primary Examiner*—W. Donald Bray
*Attorney, Agent, or Firm*—Burgess, Ryan & Wayne

[57] ABSTRACT

A numerical controlled router is enclosed by a housing mounted on a support structure wherein the housing has an opening formed in front of a router head structure. Bearings are provided outside of the housing.

A rotatable shaft is rotatably supported by the bearings and two suction tables are attached to the rotary shaft and the table can be inclined by rotary cylinders.

5 Claims, 6 Drawing Sheets

NUMERICAL CONTROL ROUTER ENCLOSED BY A HOUSING

BACKGROUND OF THE INVENTION

The present invention relates to a numerical controlled router enclosed by a housing having an opening which is closed alternately by two suction tables.

In the numerical controlled router for processing a process board, horizontally arranged rails are mounted on a horizontal beam supported by a supporting structure on a base; a head structure is supported by the rails to move horizontally, the head structure carrying a head movable vertically, the head is also movable in a direction away from the support rails, the motors are mounted on the head structure and processing tools such as drills or cutters are respectively attached to a shaft of the motors.

Table rails are provided below the heads, a suction table on which a process board is mounted is moved on the rails below the head structure according to the controls.

Since the numerical control router is not covered by any housing and the suction table is moved under the heads, wood chips and dust are scattered on and near the suction table and noise is generated when the process board is processed.

SUMMARY OF THE INVENTION

It is, therefore, an object of the present invention to provide a numerical control router enclosed by a housing in which chips and dust are confined when a process board is being processed.

It is another object of the present invention to provide a numerical control router enclosed by a housing having two suction tables which alternately close the opening of the housing.

It is still another object of the present invention to provide a numerical control router enclosed by a housing in which a process board is to be processed mounted on a first suction table and is processed and while the process board on the first table is being processed, a processed process board is removed from a second suction table and a new process board to be processed is mounted on the second suction table.

In order to accomplish the above and other objects, the present invention comprises a horizontally movable member which moves on horizontal rails supported by a structure, a vertically movable member moving on vertical rails is arranged on the horizontally movable member, a head structure mounted on the vertically movable member comprises heads carrying process tools such as a drill and a cutter respectively, the head structure is movable away from the horizontally and vertically movable members, a housing enclosing and surrounding the horizontal movable member, the longitudinal movable member and the head structure, the housing being supported by the support structure and having an opening in a side facing the process tools, bearing members arranged outside of the housing supporting a rotatable shaft, means for rotating the rotatable shaft supported by the bearing member, two suction tables arranged opposite each other rotatable with the rotatable shaft, whereby a first suction table carrying a process board to be processed closes the opening of the housing by rotation of the rotatable shaft by the rotating means and a processed process board is removed from a second suction table and a new process board is mounted on the second suction table.

DESCRIPTION OF THE PREFERRED EMBODIMENTS

Figure 1:
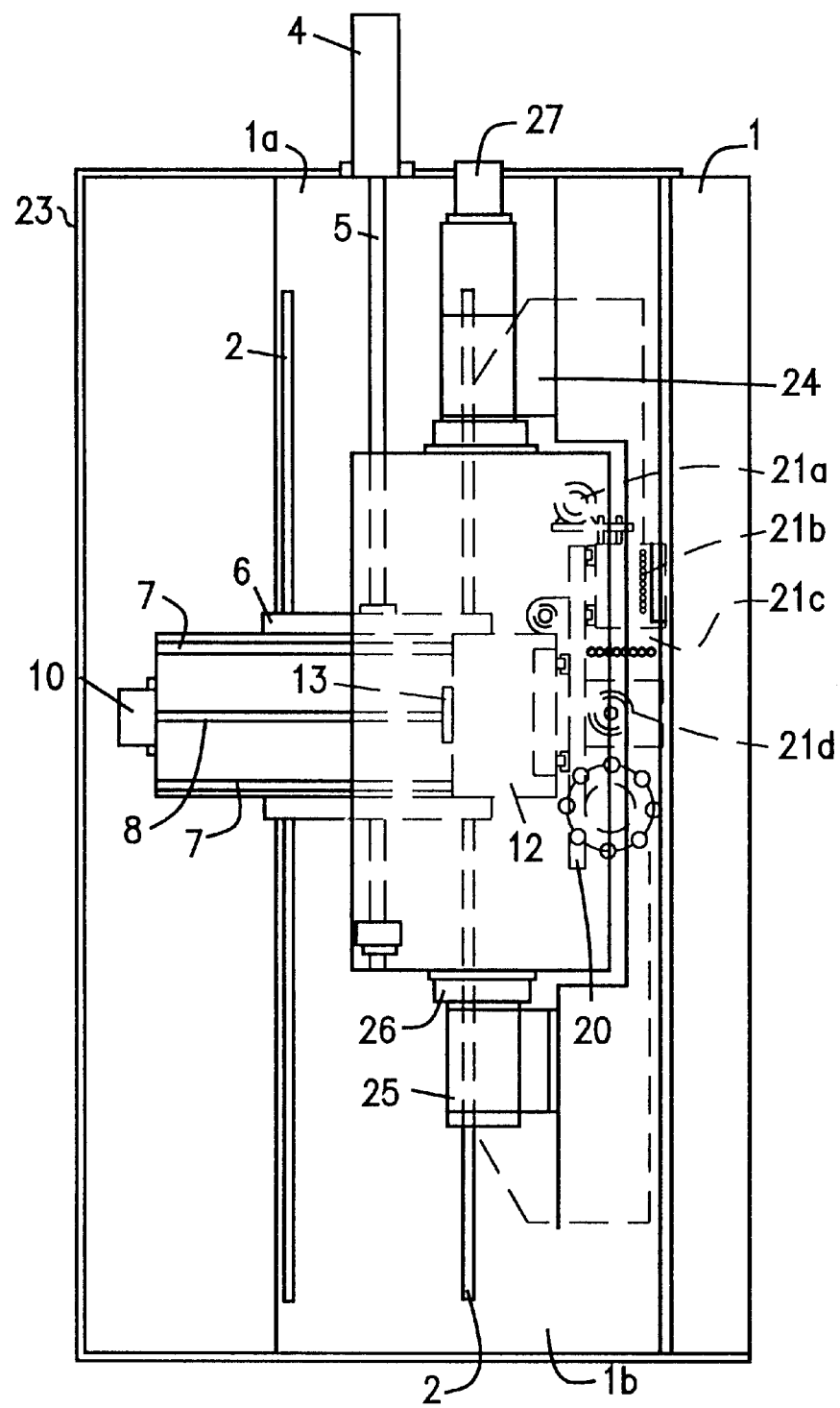
FIG. 1 is a front view of an embodiment of a numerical controlled router enclosed by a housing of the invention.

As shown in Figs, 1, 2 and 3, a horizontal beam member 1a is mounted on a support structure 1, horizontal rails 2 are mounted on a side of the horizontal beam member 1a. A horizontally movable member 6 is arranged to ride on rails 2 by bearing means 2a and 2b. A screw shaft 3 is provided in a hollowed out portion of the horizontal beam member 1a between the horizontal rails 2. The screw shaft 3 is rotated by a rotating means such as a motor 4, and engages screw engaging member 5 to move member 6 horizontally on the bearings 2a and 2b between rails 2 in a horizontal direction. Vertical rails 7 are arranged on a front face of the horizontally movable member 6, a screw shaft 8 is arranged on the horizontally movable member 6 between the vertically arranged rails 7 and is connected to a power transmission member 10 which is rotated by a servomotor 9 mounted near the top of the horizontally movable member 6. Bearings 11 are engaged with the vertical rails 7 and a screw engaging member 13 is engaged with the screw shaft 8 arranged in a vertically movable member 12.

Parallel rails 15 are arranged on a lower surface of a structure supporting member 14 provided on the vertically movable member 12. A screw shaft 16 rotatable by a servomotor 17, a screw engaging member 19 is mounted on a head structure 20 to move head structure 20 toward and away from vertically movable member 12 on which it is arranged, by bearing 18 which engages rails 15. Heads 21a, 21b, 21c and 21d are arranged on the head structure 20 to be moved by a cylinder 22.

A housing 23 is supported at the back and sides by the horizontal beam member 1a and at the front and sides by a stretched member 1b of the support structure 1. An opening 23a is formed in the housing 23 in front of the head structure 20. Bearing members 24 and 25 are mounted on the stretched member 1b, and a rotatable shaft 26 is rotatably supported by bearing members 24 and 25. Rotation means 27 is arranged at one end of the rotatable shaft 26 to rotate shaft 26. One side of each of two suction tables 31c and 32c are respectively attached to support members 29 and 30 and the rotatable shaft 26 between the support members 29 and 30. Rotary supports 33 and 34 are attached to the rotatable shaft 26 near the support members 29 and 30. The bases of cylinders 35 and 36 are rotatably attached to the rotary supports 33 and 34, respectfully; the driving shafts 35a and 36a of the cylinders 35 and 36 are attached to support members 31a and 31b near the suction tables 31c and 32c. The table supporting members 33 and 34, and the suction tables 31c and 32c are inclined by driving the cylinders 35 and 36. The process boards are shown as 31 and 32.

Figure 2:
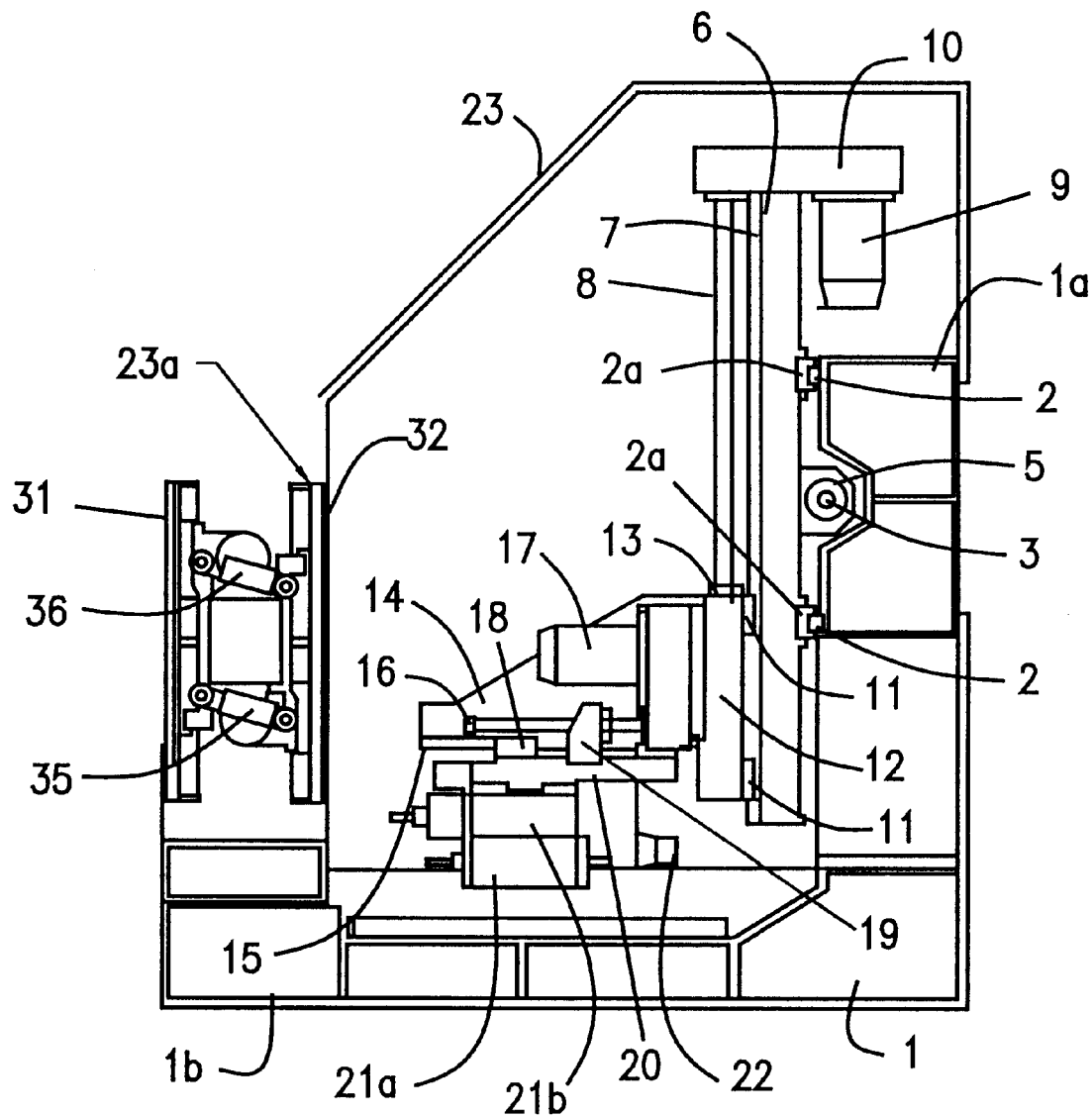
FIG. 2 is a right side view of the numerical controlled router of FIG. 1.

In the numerical controlled router of the present invention, as shown in FIG. 2, the one suction table 31c carrying process board 31 is vertically arranged in front of the opening 23a of the housing 23. The other table 32c carrying process board 32 is vertically arranged to close the opening 23a of housing 23.

Figure 3:
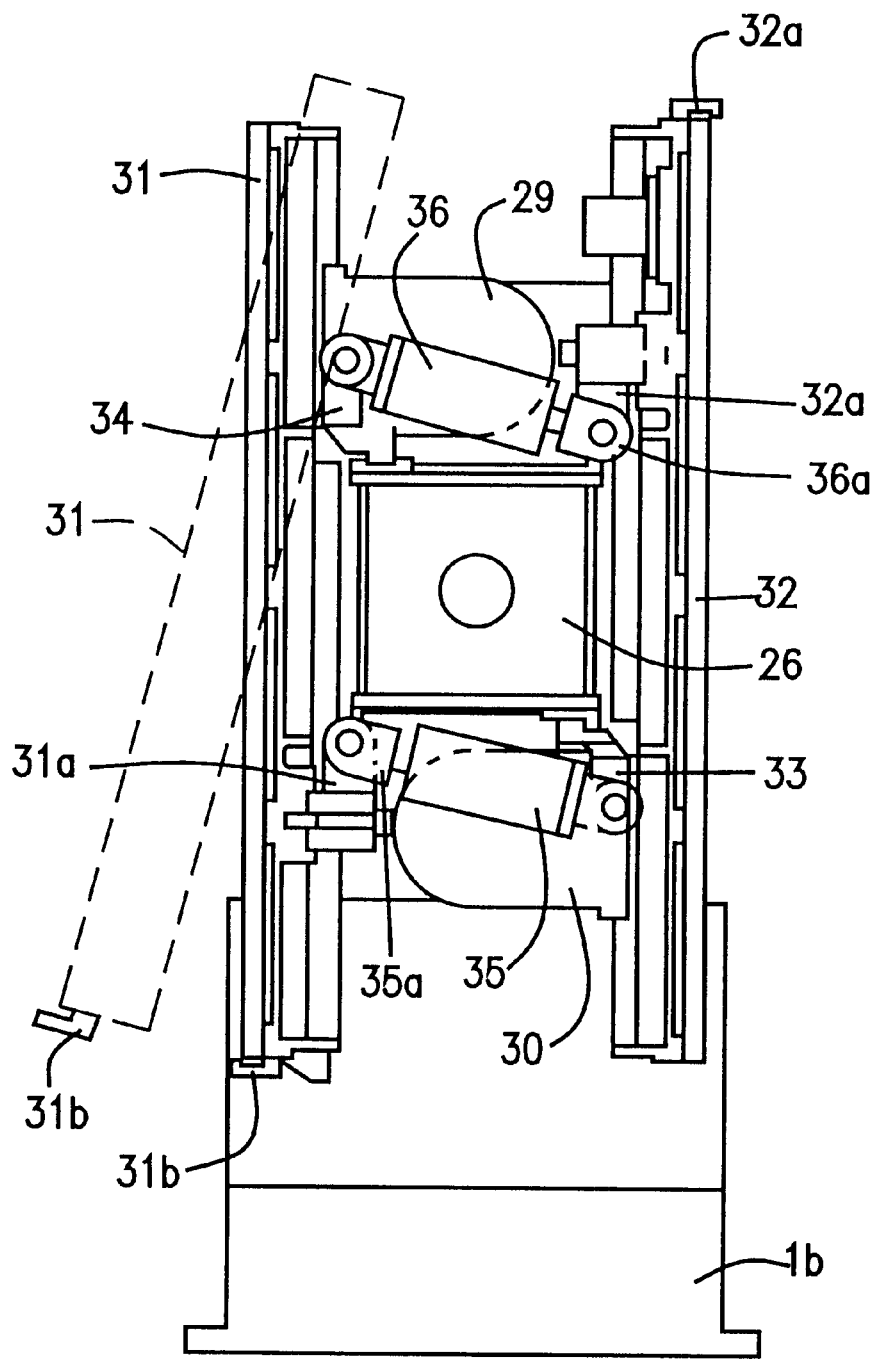
FIG. 3 is an enlarged partial view of the suction tables of the numerical controlled router of FIG. 2.

The one suction table 31c is inclined by driving the cylinder 35 as shown in FIG. 3; a process board 31 is positioned on the suction table 31c when the end of the process board is put on the suction table 31c. Then the cylinder 35 is returned to the original position, and the suction table is vertically positioned. After the suction table 31c carrying process board 31 is positioned to close opening 23a, the head structure 20 is positioned by driving the servomotors 4 and 9 and moving the horizontally movable member 6 and the vertically movable member 12 and is projected to a predetermined position by the servomotor 17. The process board 31 mounted on the suction table 31c by which the opening 23a is closed is machined by projecting the heads 21a to 21d.

When the machining of the process board is completed, the rotatable shaft 26 is rotated by the rotating means 27, and the other suction table 32c carrying process board 32 is positioned to close the opening 23a by turning. Then, the suction table 31c is inclined by driving the rotary cylinder 35; the processed process board is removed from the suction table 31c; a new process board 32 is positioned on the suction table 32c by placing it in contact with the end support 32a of the suction table 32c whereby the new process board on the suction table 32c is ready for processing next. The suction table 32c is positioned to close the opening 23a by driving the rotating means 27 and the process board 32 on the suction table 32c is processed by driving the head structure 20 and the heads 21a to 21d.

As stated above, because the two suction tables 31c and 32c are positioned to close alternately the opening 23a by driving the rotation means 27 and the process boards 31 and 32 mounted on the suction tables 31c and 32c are alternately processed the work time for respectively mounting and machining the two process boards 31 and 32 is shortened and work efficiency is improved. Also, because the two tables 31c and 32c are vertically positioned in the opening 23a, wood chips and dust generated in the machinery fall under the inner suction table and along the housing 23. Therefore, it is not necessary to clean the process board and the inner suction table and the inner portion of the housing 23 may be cleaned at predetermined intervals. A factory in which the numerical control router of the present invention is set is kept clean and is quiet because noise is absorbed by the housing 23.

Numeric controllers for machining equipment are known. The controller is programmed and arranged to operate the positioning means and routing tools in sequence. Since a belt conveyer 37 is set on the stretched member 1b of the support structure 1 and the end of the belt conveyer 37 is projected outside of the housing 23, the fallen wood chips and dust are collected at the outside of the housing 23.

Figure 4:
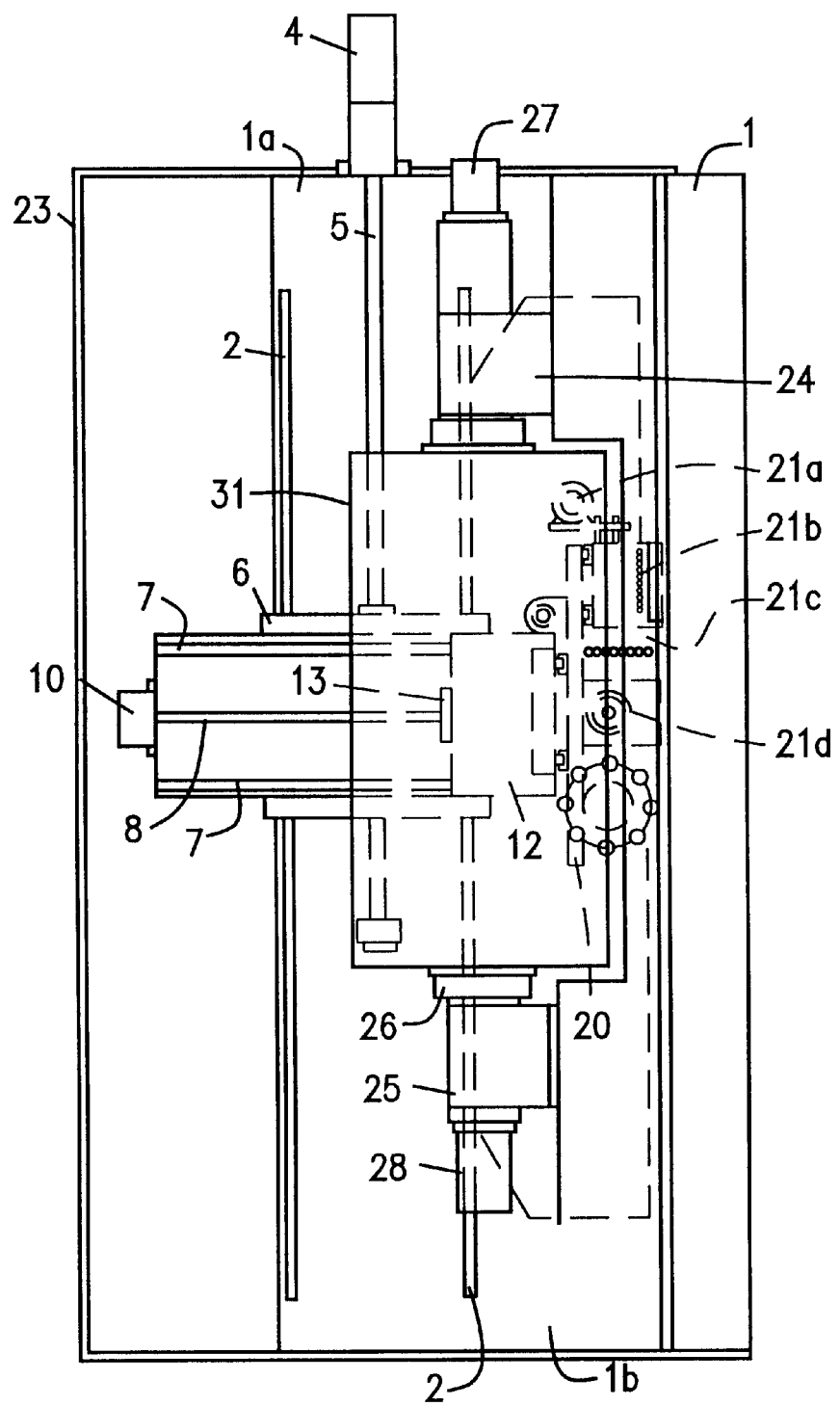
FIG. 4 is a front view of a second embodiment of the invention.

FIG. 4 shows a front view of a numerical controlled router of a second embodiment of the invention. 1 designates a support structure; 2, horizontal rails; 5, a screw shaft; 4, a servomotor; 6, a horizontally movable member; 7, vertical rails; 8, a screw shaft; 10, a connecting member; 12, a vertically movable member; 13, a screw engaging member; 20, a head structure, 21a to 21d, heads; 24 and 25, bearing members; 26, a rotatable shaft; the construction is the same as the embodiment of FIGS. 1, 2 and 3 and the explanation of the construction is therefore omitted. In this embodiment, rotating means 27 and 28 are attached to the rotary shaft 26, whereby the rotation of the two suction tables 31 and 32 is smoothly accomplished.

Figure 5:
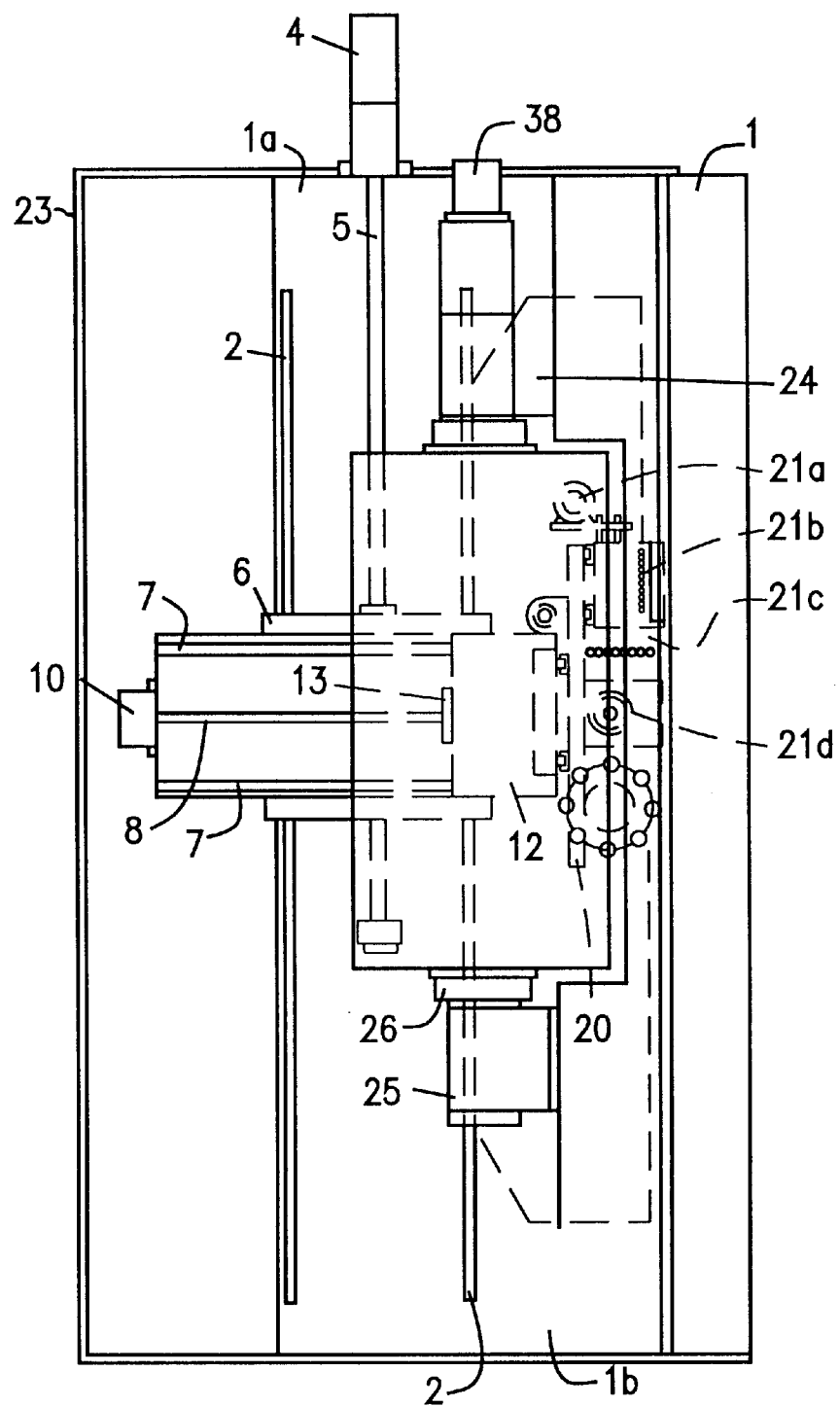
FIG. 5 is a front view of a third embodiment of the invention.

FIG. 5 shows a front view of a numerical controlled router of another embodiment in the invention. 1, designates a support structure; 2, horizontal rails; 5, a screw shaft; 4, a servomotor; 6, a horizontally movable member; 7, vertical rails; 8, a screw shaft; 10, a connecting member; 12, a vertically movable member; 13, a screw engaging member; 20, a head structure; 21a to 21d, heads; 24 and 25, bearing members; 26, a rotatable shaft. The construction is the same as the above embodiment of FIGS. 1, 2 and 3 and the explanation of the construction is therefore omitted. In this embodiment, a servomotor 38 having a speed change gear is attached to the rotatable shaft 26 as the rotation means 27 and 28.

The same effect as the above embodiment can be obtained in this embodiment.

Figure 6:
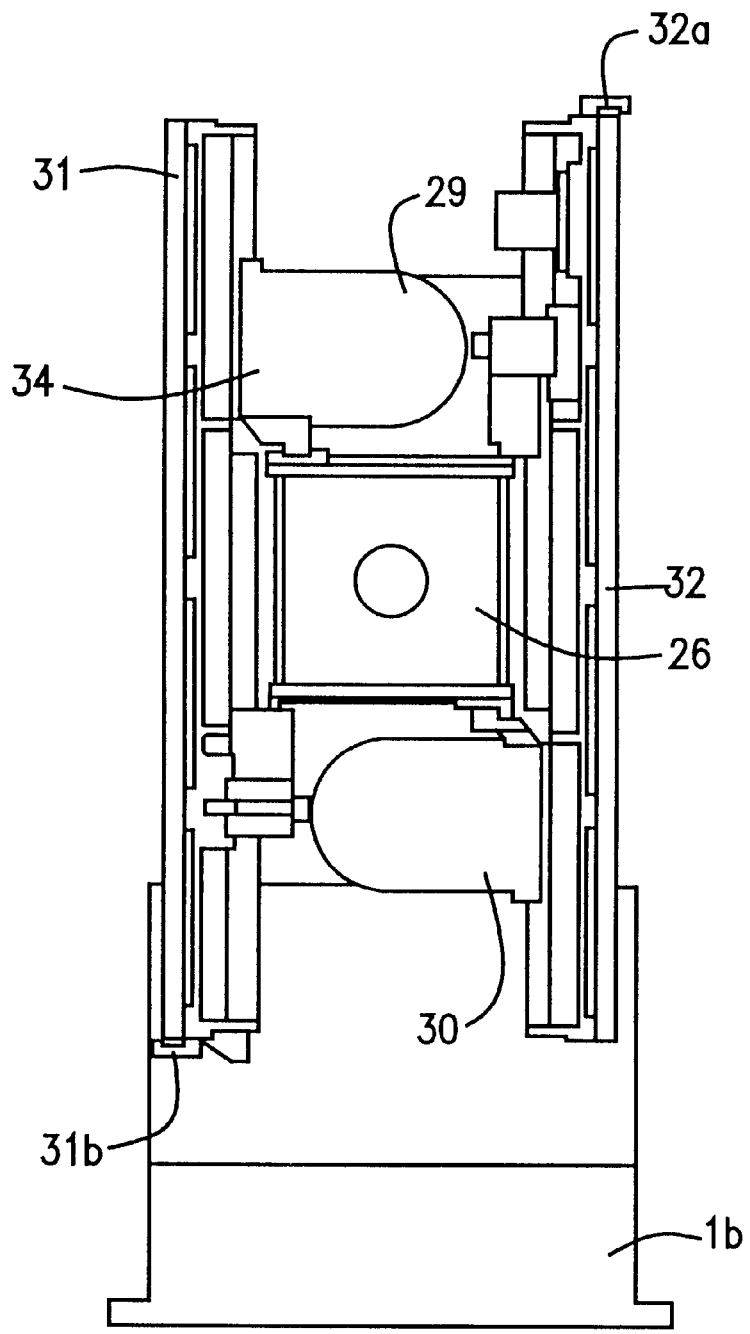
FIG. 6 shows an enlarged partial view of a fourth embodiment of the invention.

FIG. 6 shows an enlarged partial view of a suction table. 26, designates a rotatable shaft; 31 and 32 are suction tables; this construction is the same as in the above embodiments shown in FIGS. 1, 2 and 3 and the explanation of this construction is therefore omitted. In this embodiment, the cylinders 35 and 36 for tilting the suction tables 31 and 32 are omitted.

In this embodiment, the suction tables 31c and 32c are so constructed as to be slightly inclined. The lower end of the outside suction table is positioned by hand. Alternatively, the two suction tables 31c and 32c are fixed on the rotatable shaft 26, to be slightly inclined.

What is claimed is:

1. A numerical controlled router enclosed by a housing comprising: a horizontally movable member movable on horizontal rails arranged on a side of a support structure, a vertically movable member movable along vertical rails arranged on the horizontally movable member, a head structure having heads arranged thereon, mounted on the vertically movable member, the heads having machining tools mounted thereon and respectively movable on the head structure in a forward and reverse manner; a housing member enclosing and surrounding the horizontally movable member, the vertically movable member and the head structure, the housing member being supported by the support structure and having an opening in front of the head structure, the bearing member being arranged on the support structure in front of the opening in the housing member outside of the housing member, a rotatable shaft supported by the bearing members, rotating means for rotating the rotatable shaft, two suction tables arranged on the rotatable shaft opposite each other, whereby a first suction table having mounted thereon a process board to be processed closes the opening of the housing by rotation of the suction table by the rotating means and a processed process board is removed from a second suction table and a process board to be processed is mounted on the second suction table while the process board on the first suction table is being processed.

2. The numerical control router enclosed by a housing as set forth in claim 1 wherein a rotating means is attached to each end of the rotatable shaft which supports the two suction tables.

3. The numerical controlled router enclosed by a housing as set forth in claim 1 wherein the rotating means for the rotatable shaft for supporting the two suction tables is a servomotor.

4. The numerical controlled router enclosed by a housing as set forth in claim 1 wherein the two suction tables are supported by two support members respectively attached to the rotatable shaft which support members are arranged to be inclined by two cylinders for easy removal of the processed process board from the suction tables.

5. The numerical controlled router enclosed by a housing means as set forth in claim 1 wherein a belt conveyer is mounted on a member of the support structure and an end of the belt conveyer projects outside of the housing means.

* * * * *